Sept. 22, 1959 T. SEEWANN 2,904,932
FLOWER VASE AND PACKING DEVICE
Filed April 16, 1954

INVENTOR.
Theodore Seewann

2,904,932

FLOWER VASE AND PACKING DEVICE

Theodore Seewann, Fort Worth, Tex.

Application April 16, 1954, Serial No. 423,722

1 Claim. (Cl. 47—41)

The invention relates to vases, decorating implements and packing devices for cut flowers.

The primary object of the invention is a vase giving a new decorating effect to flower arrangements and in particular also to the display of only one flower or a few.

Another object of the invention is a vase which works with only a moderate amount of water filling.

Another object of the invention is a vase which is safe against being turned over when a person is touching the flowers.

Another object of the invention is a transporting device for cut flowers.

These and other advantages of the invention will be more manifest from the following specification and the claim set forth.

Figure 1:
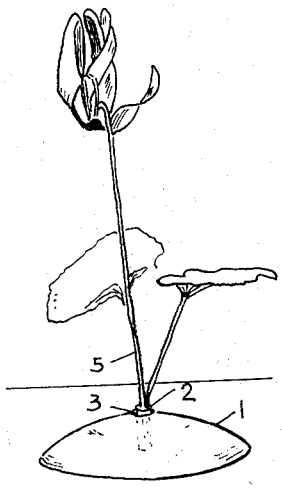
Figure 1 is a perspective view of a preferred embodiment of the invention, showing a single flower on display.
Figure 3:
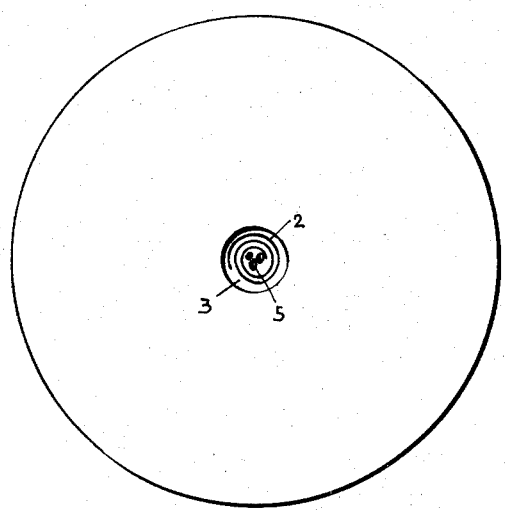

Figure 3 a top-view of the vase, pictured in Figure 1.

Figure 4:
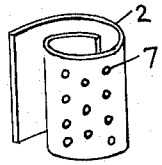
Figure 2:
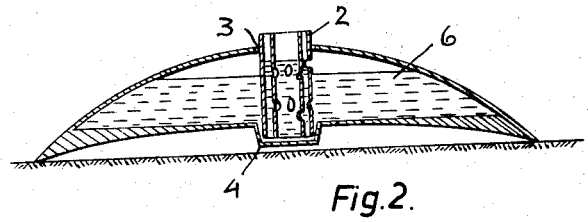
Figure 2 is a vertical cross-section.

Figure 4 is a perspective view of the member 2 in Figure 2.

Figure 5:
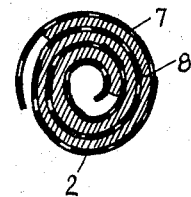

Figure 5 is a horizontal cross-section through such a member showing an insert added.

Figure 6:
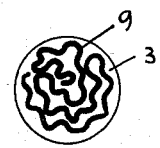

Figure 6 is a cross-section, taken horizontally, through a modification of such member.

Figure 7:
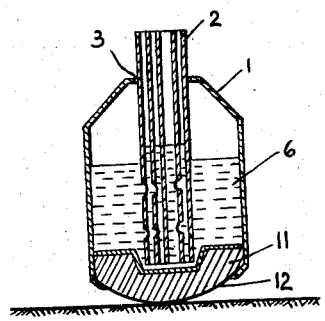

Figure 7 is a vertical cross-section through another preferred embodiment of the invention.

As may be seen from the Figures 1, 2 and 3 the vase consists principally in the combination of the low vase container 1 with the removable insert member 2, acting as flower holder. The vase container has been given a dome-like shape, the upper surface of which has been provided with an opening 3 serving as guide for the insert member 2. To give this member 2 additional lateral support on its lower end, a downward recess 4 may be provided in the bottom of the vase container opposite the opening 3. An upturned flange may be used instead of the recess 4. In its most simple form the insert member could be a pipe sleeve, preferably with some sort of perforation to admit the entrance of water. But with the diameter of the various flower arrangements to be displayed of different sizes each vase would necessitate various insert members of this kind. Figures 2 to 6 show improvements. The insert member, shown in Figures 2, 3 and 4 has the shape of a spiral coil, which is preferably made from a transparent sheet of plastic, which is easy to cut to size and which, when bent under heat, retains enough resiliency to act as a spring, holding the flowers together, when wrapped around the stems 5 of the flowers. A coil of this kind has some leeway in wrapping, and will when inserted into the vase container, press itself against the guiding edges giving thereby the insert good lateral support. With the windings of the coil relatively close together, capillary action is created, which draws water towards the flower stems, even though the water supply would be low. To ease the onflow of water from the water filling 6, the coil may be provided with some sort of perforation 7.

Figure 5 shows a modification of such an insert member 2 insofar that a water absorbent material 8, which may be some sort of textile, is interposed between the windings of the coil. An arrangement like that will not only act as a regulator for the onflow of water, but will, when treated chemically, supply the plants with additional nourishment by slow dissolution of such loading. A coil as shown in Figure 5 may also be used as a transporting device for cut flowers. Wrapping it around the flower stems it will hold them together and, when then dipped into water, will act as a nourishing water storage for the transport.

Figure 6 shows a modification of the insert member of a vase as described. Here the windings are made from a corrugated sheet 9, which folds closely together and provides enough elasticity to hold the insert member in the vase and allows for different sizes of flower stems. The other features as mentioned in connection with the spiral coil could be used here too.

Vases of the described kind give a new and good decorating effect, as may be seen from Figure 1, by displaying the flowers in full height, giving them thereby a more natural, that is, truer to life, appearance. The vase works with a moderate amount of water and is secure against over turning. With closely fitting insert members the vase could even be lifted up 90 degrees on one side without spilling water.

The embodiment illustrated in Figure 7 shows the combination of vases of the described character with a rocking device. By fastening to the bottom of the vase container 1 an extension 11, giving it a spherical bottom surface and making it from a material of relative high specific weight, a rocking of the vase is achieved when bringing the vase out of equilibrium.

It is easy to understand that by replacing the extension 11 with a rubber suction cup a vase would result, which could be fixed to a smooth surface by simply pressing it down.

I claim:

A flower vase comprising a low, hollow, dome-shaped body having a closed bottom wall, a single opening in its dome-shaped upper wall, and an internal recess in the bottom wall vertically aligned with said opening, a closely coiled strip of thin, resilient material within the body and supported at its ends by the walls of said opening and said recess respectively, said strip being perforated to permit the passage of water from the interior of said body to the spaces between the coils, and a strip of water absorbing and holding material positioned between and in contact with adjacent coils of said strip of material.

References Cited in the file of this patent

UNITED STATES PATENTS

| | | |
|---|---|---|
| 496,013 | Snow | Apr. 25, 1893 |
| 664,871 | Keyser | Jan. 1, 1901 |
| 1,598,362 | Brice | Aug. 31, 1926 |
| 1,616,894 | Finlayson | Feb. 8, 1927 |
| 1,963,824 | Cassedy | June 19, 1934 |
| 2,062,577 | Kaplan | Dec. 1, 1936 |

FOREIGN PATENTS

| | | |
|---|---|---|
| 57,992 | Denmark | Sept. 16, 1940 |
| 758,427 | France | Nov. 3, 1933 |
| 603,978 | Germany | Oct. 12, 1934 |
| 362,737 | Great Britain | Dec. 10, 1931 |